US012336968B2

(12) United States Patent
Berto

(10) Patent No.: US 12,336,968 B2
(45) Date of Patent: Jun. 24, 2025

(54) FILLING APPARATUS WITH INTERCHANGEABLE FILLING UNITS

(71) Applicant: DOTT. BONAPACE & C. S.R.L., Cusano Milanino (IT)

(72) Inventor: Simone David Berto, Garbagnate Milanese (IT)

(73) Assignee: DOTT. BONAPACE & C. S.R.L., Cusano Milanino (IT)

( * ) Notice: Subject to any disclaimer, the term of this patent is extended or adjusted under 35 U.S.C. 154(b) by 0 days.

(21) Appl. No.: 18/577,872

(22) PCT Filed: Jul. 11, 2022

(86) PCT No.: PCT/IB2022/056373

§ 371 (c)(1),
(2) Date: Jan. 9, 2024

(87) PCT Pub. No.: WO2023/007287

PCT Pub. Date: Feb. 2, 2023

(65) Prior Publication Data

US 2024/0307267 A1 Sep. 19, 2024

(30) Foreign Application Priority Data

Jul. 26, 2021 (IT) ........................ 102021000019871

(51) Int. Cl.
*A61J 3/07* (2006.01)

(52) U.S. Cl.
CPC .................................... *A61J 3/074* (2013.01)

(58) Field of Classification Search
CPC .. A61J 3/074; A61J 3/07; B65G 47/00; B65B 1/30
See application file for complete search history.

(56) References Cited

U.S. PATENT DOCUMENTS 3,978,640 A * 9/1976 Crossley .................. A61J 3/07 53/468
4,884,602 A * 12/1989 Yamamoto ............. A61J 3/074 141/238
(Continued)

FOREIGN PATENT DOCUMENTS

EP 1512632 A2 3/2005

*Primary Examiner* — Gloria R Weeks
(74) *Attorney, Agent, or Firm* — Dickinson Wright PLLC; Andrew D. Dorisio

(57) ABSTRACT

A filling apparatus (10) for filling capsules with powdered substances for pharmaceutical or parapharmaceutical use or the like, includes a body-machine (12) inside which the mechanical and electrical and/or electronic components are housed which are adapted to operate an operating unit (14) comprising a body (18) supporting a rotating table (19) adapted to receive capsules to be filled with a powdered product from a capsule feeding station (22), move them in the direction of a filling station (24) functional for filling said capsules with the powdered product and eject them once filled at an ejection station (26), the apparatus in which the filling station (24) includes a tamping filling unit (40) or a dosing filling unit (42) which are interchangeable with respect to the body-machine for a variation of the filling configuration of the capsules with the powdered product.

8 Claims, 4 Drawing Sheets

(56) References Cited

U.S. PATENT DOCUMENTS

| | | | | | |
|---|---|---|---|---|---|
| 4,922,682 | A * | 5/1990 | Tait | A61J 3/072 | 53/329.3 |
| 5,081,822 | A * | 1/1992 | Boyd | A61J 3/074 | 53/485 |
| 5,348,062 | A * | 9/1994 | Hartzell | A61J 3/07 | 53/900 |
| 5,966,910 | A * | 10/1999 | Ribani | A61J 3/074 | 53/291 |
| 6,168,045 | B1 * | 1/2001 | Ansaloni | B65G 47/1457 | 221/277 |
| 6,170,226 | B1 * | 1/2001 | Chang | A61J 3/074 | 53/64 |
| 6,327,835 | B1 * | 12/2001 | Trebbi | A61J 3/074 | 53/53 |
| 6,539,686 | B1 * | 4/2003 | Trebbi | A61J 3/074 | 53/53 |
| 8,561,282 | B2 * | 10/2013 | Hirota | A61J 3/074 | 29/469 |
| 8,991,442 | B1 * | 3/2015 | Navin | B65B 43/50 | 141/2 |
| 9,157,784 | B2 | 10/2015 | Trebbi | | |
| 2007/0044433 | A1 * | 3/2007 | Runft | A61J 3/074 | 53/900 |
| 2008/0236106 | A1 * | 10/2008 | Trebbi | A61J 3/072 | 53/471 |
| 2009/0205748 | A1 * | 8/2009 | Ansaloni | B65B 3/323 | 141/250 |
| 2010/0132313 | A1 * | 6/2010 | Trebbi | B65B 1/366 | 53/471 |
| 2011/0088355 | A1 * | 4/2011 | Fulper | A61J 3/074 | 53/111 R |
| 2016/0089302 | A1 | 3/2016 | Scheffler | | |

* cited by examiner

FILLING APPARATUS WITH INTERCHANGEABLE FILLING UNITS

TECHNICAL FIELD

The present invention relates to an improved filling apparatus. More in particular, the present invention relates to a filling apparatus of capsules with powdered substances, for example, medicinal and for pharmaceutical or parapharmaceutical, nutraceutical use or the like, with said capsules of the rigid gelatin type or similarly suitable for the purpose.

BACKGROUND

As is known, filling apparatuses operate by loading the powdered substances into capsules which are typically defined as two half-shells coupled together for the containment of the powder, with said half-shells which, for filling the capsules, are separated and then re-coupled together once the powdered product has been inserted into one of said half-shells.

The capsule filling apparatuses typically comprise a set of different functional elements for feeding the empty capsules, correctly orienting said capsules for filling, separating the two half-shells defining a single capsule, filling one of the half-shells with the powdered product, closing said filled half-shell with the other half-shell forming the capsule, ejecting the filled capsule, checking the quality of the product, etc.

With reference to the filling methods of the capsules, two filling techniques are known, defined by a tamping method and a dosing method.

In the case of a tamping filling technique, the powdered product is pressed several times before being fed into one of the half-shells of the capsule; such a filling technique comprises a progressive compression of small quantities of product in a dosing disk by means of compression pistons with subsequent ejection of the compressed product and with its insertion into a half-shell of the capsule.

In the case, instead, of the filling technique of the dosing type, a dosing medium is immersed in a tank containing the powder for filling the capsules so as to pick up a quantity of powder which is compacted inside the dosing medium by means of a plunger with which said means is provided, with the powder which is thus picked up and compacted is fed into one of the half-shells of the open capsule as described above.

The two types of filling techniques substantially ensure the same production performance; however, the tamping filling technique is more used in the case of fully automatic machines as it ensures a high level of accuracy, while the dosing filling technique is particularly suitable in the case of microdosing (for example, capsules which contain a quantity of powder less than or equal to 200 milligrams).

As can be seen from the foregoing, the known capsule filling apparatuses have some significant drawbacks related to the fact that such apparatuses must be chosen based on the features of which to fill the capsule and, the powdered product with therefore, depending on the type of powdered product, an apparatus with tamping filling technique or an apparatus with dosing filling technique must be used.

The above entails a cost disadvantage, given the fact that it is necessary to have at least two different filling devices in order to manage the production of capsules of different types of powdered products.

The above drawback entails a consequent drawback also related to the investment costs related not only to the need to have two different filling devices, but also to the tooling of the workspaces of said two devices.

EP1512632 and U.S. Pat. No. 9,157,784 refer to a filling apparatus which comprises a plurality of movable filling stations on wheels which are coupled with the filling apparatus as a function of the type of filling required.

Even such known solutions do not solve the problems mentioned above, since to vary the type of filling they need modules defined by movable devices which are coupled to the main device and, therefore, have the same disadvantages of tooling the spaces, warehouse costs and the like.

The object of the present invention is to overcome the drawbacks described above.

SUMMARY

More in particular, an object of the present invention is to provide an improved filling apparatus for capsules and, more specifically, a “universal/reconfigurable” type apparatus adapted to allow the same apparatus to be used regardless of the filling technique used.

A further object of the present invention is to provide a filling apparatus for capsules for which the operating filling type reconfiguration is both simple and rapid.

A further object of the present invention is to provide a filling apparatus adapted to allow to limit production costs as well as the physical spaces necessary for the positioning of the same apparatus.

A further object of the present invention is to provide users with an improved filling apparatus for capsules adapted to ensure high resistance and reliability over time and furthermore, such as to be easily and economically made.

These and other objects are achieved by the invention having the features according to claim 1.

According to the invention, an improved filling apparatus is provided for filling capsules with powdered substances for pharmaceutical or parapharmaceutical use or the like, comprising a body-machine inside which the mechanical and electrical/electronic components are housed which are adapted to operate an operating unit comprising a body supporting a rotating table adapted to receive capsules to be filled with a powdered product from a capsule feeding station, move them in the direction of a filling station functional for filling said capsules with the powdered product and eject them once filled at an ejection station, the filling station being reconfigurable by means of an interchangeability between a tamping filling unit or a dosing filling unit for a variation of the filling configuration of the capsules with the powdered product.

Advantageous embodiments of the invention appear from the dependent claims.

BRIEF DESCRIPTION OF THE DRAWINGS

The constructive and functional features of the improved filling apparatus for capsules of the present invention can be better understood from the following detailed description, in which reference is made to the attached drawing tables which represent a preferred and non-limiting embodiment and wherein.

DETAILED DESCRIPTION

Figure 1:
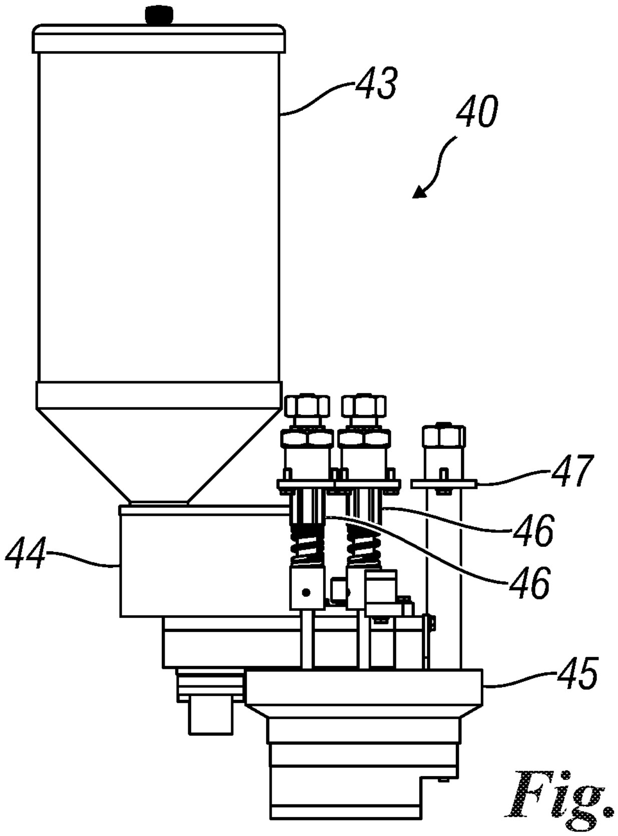
FIG. 1 schematically depicts a front view of a tamping type filling device of the improved filling apparatus of the invention.

With reference to the aforementioned figures, the improved filling apparatus of the invention is indicated as a whole with 10 and comprises a body-machine 12 inside which are housed the mechanical and electrical/electronic components adapted for the operation of the apparatus and, more in particular, for the operation of an operating unit 14 which, as better described below, comprises the devices functional to the feeding, movement and filling of the capsules.

The machine body 12 is, in the preferred embodiment shown in the figures, provided with wheels 15 functional to the movement and positioning of the apparatus inside the production space and doors 16 which can be opened for maintenance, inspection, repair and the like of the mechanical and electrical/electronic components arranged therein (it is to be understood that, in accordance with alternative embodiments, said wheels may be absent).

Outside the body-machine 12 the operating unit 14 is arranged, which comprises a body 18 which supports a rotating table 19 adapted to receive the capsules to be filled (not shown in the figures) coming from a capsule feeding station 22, to move them in the direction of a filling station 24 functional to the filling of said capsules with a powdered product, to close them at the station 28 and to eject them once filled with the powdered product at an ejection station 26.

The capsules coming from the feeding station 22, when they are fed on the rotating table 19, are opened and, more specifically, the two half-shells forming the single capsule are separated from each other to define a first half-shell adapted to be filled with the powdered product at the filling station 24 and a second half-shell which follows the path of the first half-shell and which is coupled to the latter in a capsule closing station 28 in which the single capsule filled with powdered product is closed and moved, again by means of the rotating table 19, in the direction of the ejection station 26.

The apparatus comprises a control unit 30 provided with a display 31 and adjusting means 32 and 33 for adjusting and setting the working parameters of the filling apparatus of the invention.

The capsule feeding station 22, not described in detail as known, substantially comprises a tank or hopper 22' for the capsules to be filled and means 22" for feeding the capsules contained in the tank or hopper 22' on the rotating table 19.

Figure 3:
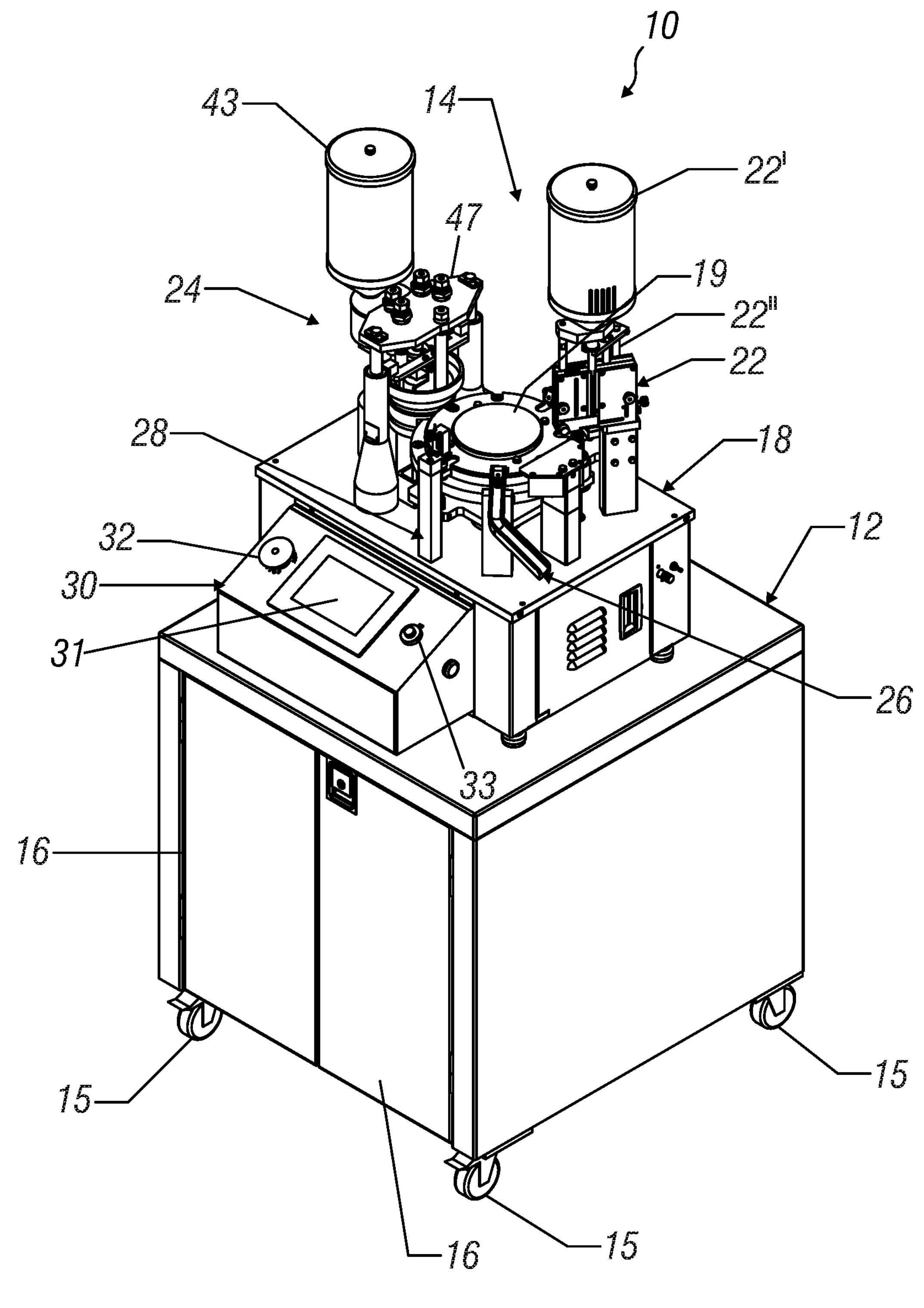
FIG. 3 schematically depicts an axonometric view of the filling apparatus of the invention provided with the tamping filling device of FIG. 1.
Figure 4:
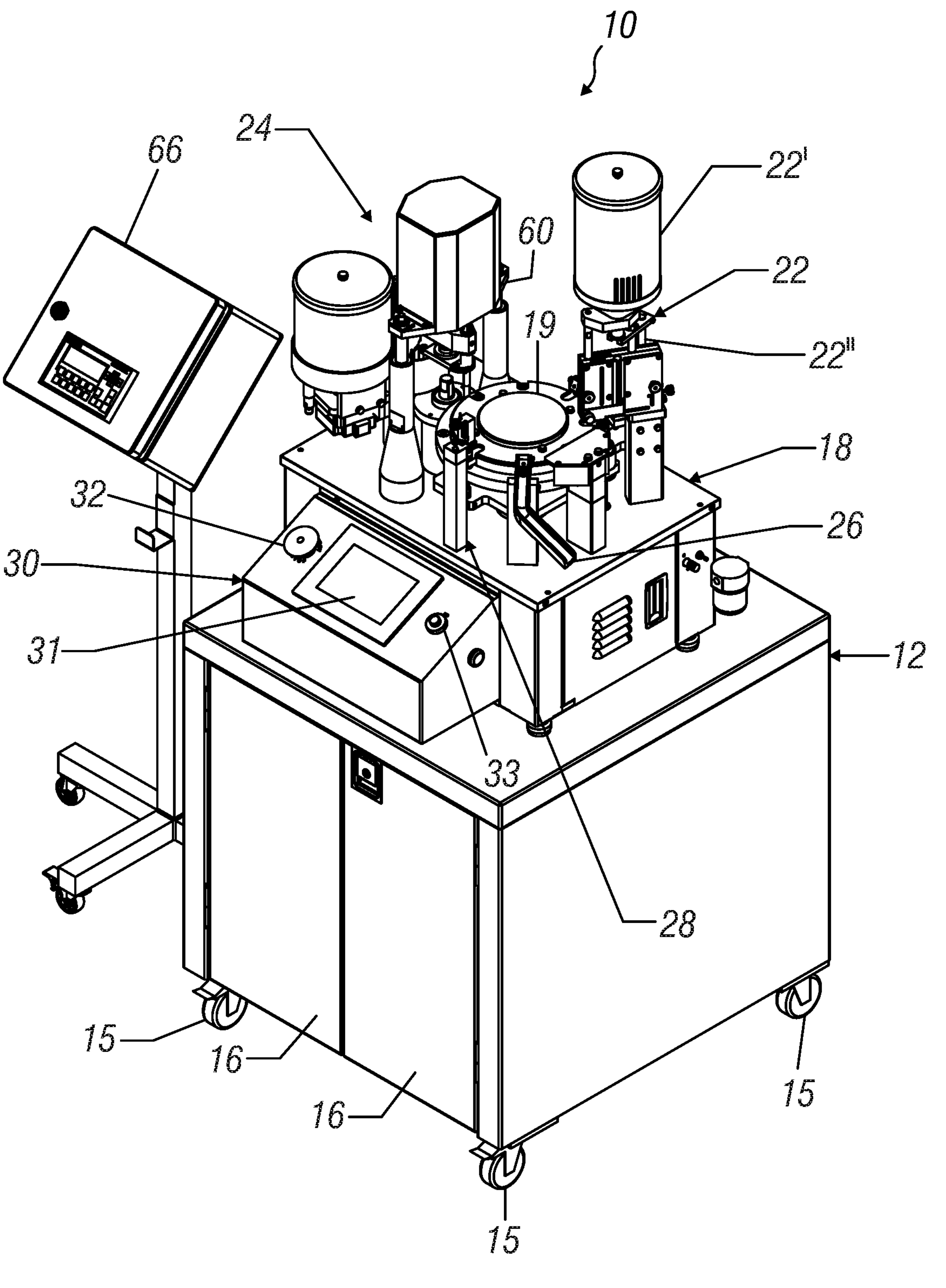
FIG. 4 schematically depicts an axonometric view of the filling apparatus of the invention provided with the dosing type filling device of FIG. 2.
Figure 5:
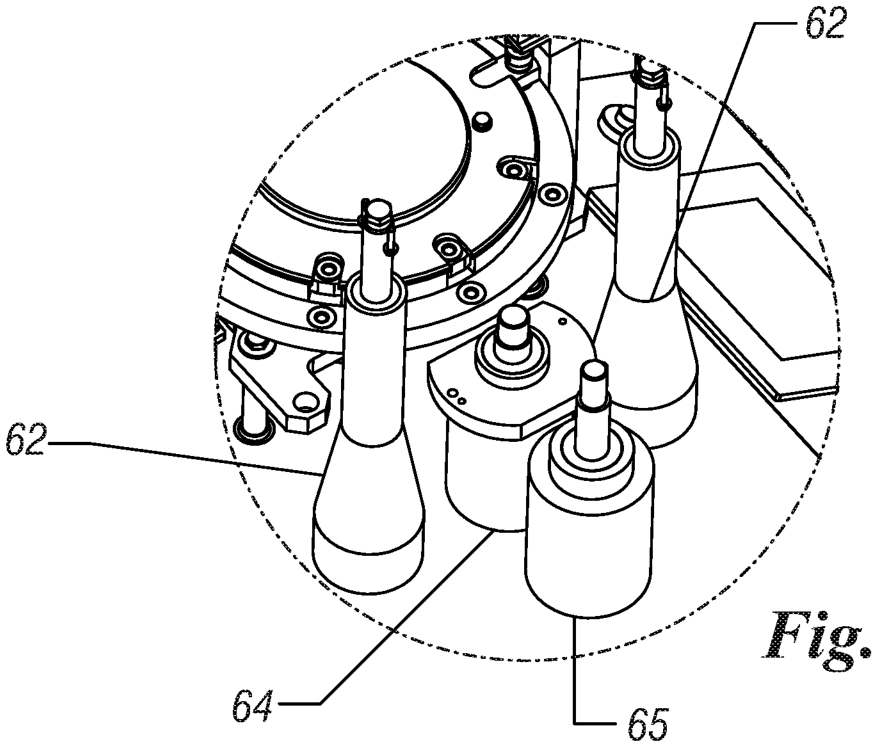
FIG. 5 schematically illustrates an enlarged detail of the filling apparatus of the invention.
Figure 6:
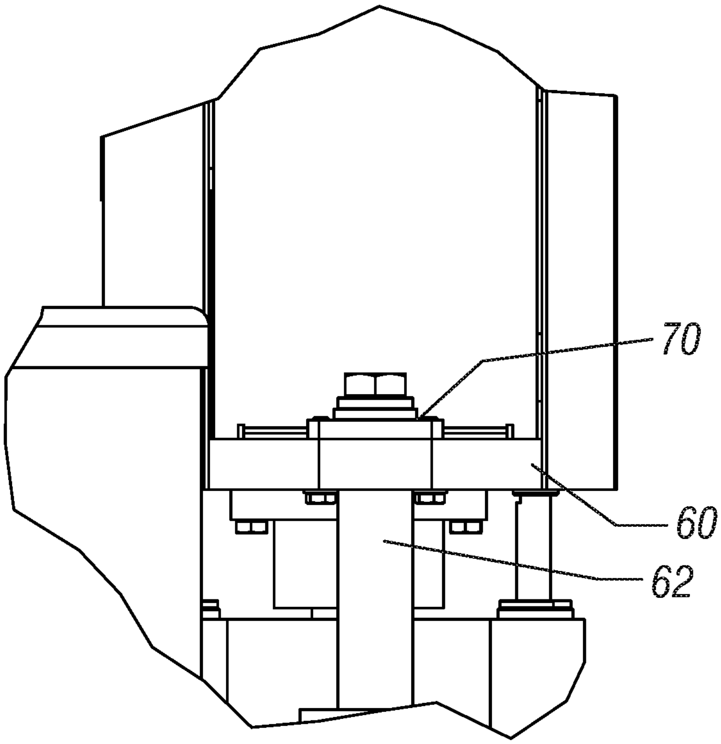
FIG. 6 schematically depicts an enlarged detail of a portion indicated with "A" in FIG. 2.

The filling station 24 can be of the tamping type, as shown in FIG. 3, or of the dosing type as shown in FIG. 4 and this depending on the filling technique of the capsules chosen according to the production needs and/or features of the capsules to be filled and/or the features of the powdered product to be filled in the capsules; depending, therefore, on the filling technique adopted, the filling unit 24 will be provided with a tamping filling unit 40 or with a dosing filling unit 42.

The tamping filling unit 40 is schematically shown in FIG. 1 and comprises (without a detailed description as it is known), a first hopper 43 containing the powdered product with which to fill the capsules, a second hopper 44 (below the first hopper) which receives the powdered product from the first hopper and feeds it to a dosing disk 45 below said second hopper, said dosing disk receiving the powdered product from said second hopper and with which the compression pins 46 of said powdered product are engaged.

The tamping filling unit 40 also comprises a plate 47 to which the compression pins 46 are stabilized and whose function will appear clearer below.

Figure 2:
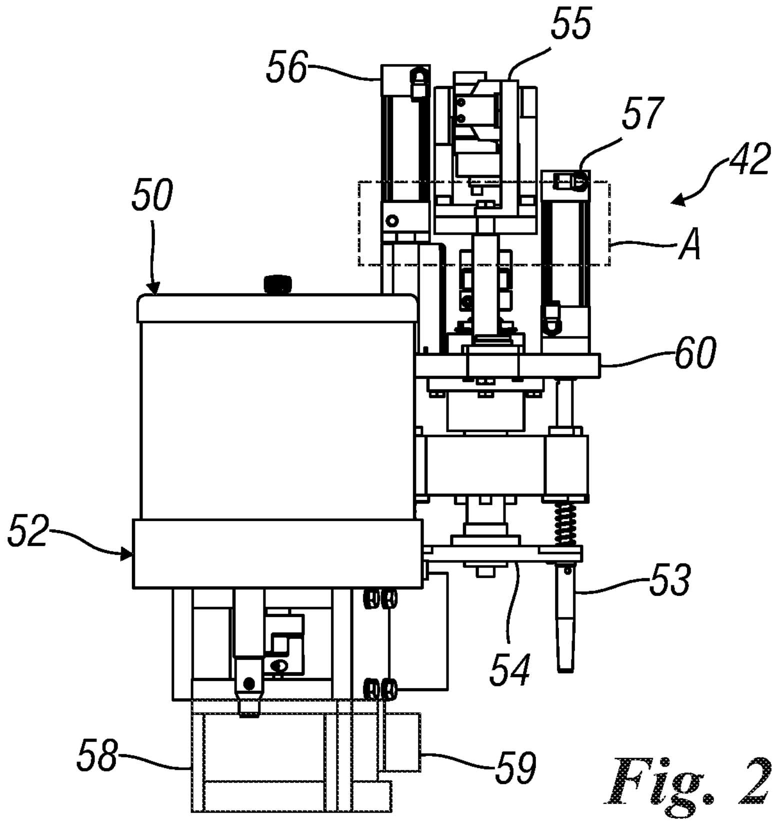
FIG. 2 schematically depicts a front view of a dosing type filling device of the filling apparatus of the invention.

The dosing unit 42 is schematically shown in FIG. 2 (not described in all details as known) comprising a first hopper 50 containing the powdered product with which to fill the capsules, a second hopper 52 arranged below the first hopper in which the powdered product is fed coming from said first hopper for a withdrawal by dosing syringes 53 arranged with respect to a rotating arm 54 moved in alternating rotation with respect to a vertical axis by means of a motor in order to move the syringes alternatively to the withdrawal of the powdered product from the second hopper 52 and to the filling of the capsule arranged on the rotating table 19 (in fact, when one syringe is in the step of withdrawing the powdered product from the second hopper the other syringe is in the step of filling the capsule); the dosing filling unit also comprises a first pneumatic cylinder 56 for compacting the powdered product withdrawn from a dosing syringe 53 from the second hopper 52 and a second pneumatic cylinder 57 for transferring the compacted powder into the capsules, a further electric motor 58 having the function of controlling the opening of falling compartments of the powdered product from the first hopper 50 to the second hopper 52 and a support bracket 59 for the second hopper 52 and whose function will be better described in detail below.

The dosing unit 42 also comprises a plate 60 to which the components functional to the rotation and movement of the dosing syringes 53 are stabilized.

The machine-body 12 comprises coupling and support means of the filling stations 24 functional to the filling of said capsules. Such means comprise a pair of parallel and opposite columns 62 vertically stabilized to the body 18 at the rotating plate 19, a first support 64 and a second support 65 likewise stabilized to the body 18.

The pair of opposite and parallel columns 62 has the function of defining a coupling and support means for the plate 47 of the tamping filling unit 40 and for the plate 60 of the dosing filling unit 42.

The columns 42 are height and the of defined adjustment/calibration of the position of the plate 47 or of the plate 60 of the filling units (in particular, the adjustment/calibration of the height position of the plate 60 of the dosing unit 42) is carried out by means of plate retaining means with respect to the pair of opposite and parallel columns defined by fixing and adjusting screws-bodies 70.

The first support 64 has the function of defining a coupling and support means for the dosing disk body 45 arranged below the second hopper 44 of the tamping filling unit 40.

The second support 65 has the function of defining a coupling and support means for the second hopper 52 and, more particularly, for the support bracket 59 of said second hopper of the dosing unit 42.

The first support 64 is arranged in an intermediate and central position with respect to the pair of opposite and parallel columns 62 at the rotating plate 19.

The second support 65 is arranged aligned with the first support 64 (and, more specifically, with respect to the radius of the rotating table passing through the support 64) and substantially adjacent thereto, the first support 64 being in an intermediate position between the rotating plate 19 and the second support 65.

The plate 47 and the plate 60 have an extension in length substantially corresponding to the distance between axes of the pair of opposite and parallel columns 62.

The stabilization of the supports (or support brackets) 47 and 60 with respect to the pair of columns 62 is carried out by retaining means described above and represented by bodies 70 which allow of the plate a fastening and an adjustment/calibration in height of the same with respect to the pair of opposite and parallel columns 62 (with an adjustment of the distance of said plate with respect to the base from which said columns extend) and, in the same manner, the stabilization with respect to the first support 64 and the first support 65 is carried out as a function of the type of filling unit.

In the case of use of a dosing unit 42, a body or control unit 66 is present as an external element to the body-machine 12 and functional to define an optional control unit to be coupled to an existing type of filling apparatus (of the tamping type) and whose control unit 30 is not configured for the dosing function; in accordance with an alternative embodiment the additional body or control unit 66 can be integrated into the control unit 30 of the body-machine 12.

The above-described means of coupling and supporting the filling stations 24 allow a stabilization of a tamping filling unit 40 or a dosing filling unit 42 (as a function of the production needs) without structural changes or modifications of the body-machine 12 and/or the filling units described.

In fact, if the filling apparatus is provided with a tamping filling unit and the production requires a change of the filling mode of the capsules, for the variation of the operating configuration, it will be sufficient to decouple the plate 47 of the tamping filling unit 40 with respect to the pair of parallel and opposite columns 62 and decouple the dosing disk body 45 with respect to the first support 64 and, subsequently, to couple the plate 60 of the dosing filling unit 42 with the same pair of parallel and opposite columns 62 and to couple the support bracket 59 for the second hopper 52 of said filling unit with the second support 65.

The stabilization of the plates 47 and 60, according to the type of filling unit, is carried out by means of the retaining means described above and represented by screws-bodies 70.

As can be seen from the above, the advantages obtained by the apparatus of the invention are clear.

The improved filling apparatus for capsules of the present invention advantageously constitutes a "universal/reconfigurable" type apparatus which allows to vary the filling technique of the capsules (tamping type or dosing type filling) without the need to use different types of apparatuses as a function of the type of filling and this by virtue of the coupling and support means of the filling stations 24 described and without the need to modify, vary or replace constituent elements of the machine body of the apparatus.

A further advantage is that the change in the configuration of the filling apparatus is simple as well as quick and this configures a related containment of production costs.

Further advantageous is the fact that the apparatus of the invention, requiring only the presence of different types of filling units, entails a containment of warehouse costs as well as physical spaces (since it is not necessary to have at least two different filling apparatuses).

Although the invention has been described above with particular reference to an embodiment given merely by way of non-limiting example, numerous modifications and variations will be apparent to a person skilled in the art in the light of the above description. Therefore, the present invention intends to embrace all the modifications and variations which fall within the scope of the following claims.

The invention claimed is:

1. An improved filling apparatus (10) for filling capsules with powdered substances for pharmaceutical or parapharmaceutical, nutraceutical use or the like, comprising a body-machine (12) inside which the mechanical and electrical and/or electronic components are housed which are adapted to operate an operating unit (14) comprising a body (18) supporting a rotating table (19) adapted to receive capsules to be filled with a powdered product from a capsule feeding station (22), move the capsules in the direction of a filling station (24) functional for filling said capsules with the powdered product and eject the capsules once filled at an ejection station (26), the apparatus characterized in that the filling station (24) comprises a pair of parallel and opposite columns (62) vertically stabilized to the body (18) at the rotating table (19), a first support (64) and a second support (65) equally stabilized to the body (18) of the operating unit (14) of the body-machine (12) for an interchangeable type stabilization of a tamping filling unit (40) or a dosing filling unit (42) with respect to said body-machine for a variation of the filling configuration of the capsule with the powdered product, said pair of parallel and opposite columns (62) whose distance between the fixed columns is corresponding to a coupling element of the tamping filling unit (40) and the dosing filling unit (42).

2. The filling apparatus according to claim 1, characterized in that the coupling element of the tamping filling unit (40) and of the dosing filling unit (42) comprise, respectively, a first plate (47) and a second plate (60), the lengthwise extension of said plates (47, 60) corresponding to the distance between the pair of parallel and opposite columns (62).

3. The filling apparatus according to claim 2, characterized in that it comprises plate retaining means (47, 60) with respect to the pair of opposite and parallel columns (62) comprising screws-bodies (70) for fixing and adjusting/calibrating the height position of said plates (47, 60).

4. The filling apparatus according to claim 1, characterized in that the columns of the pair of parallel and opposite columns (62) are of fixed height.

5. The filling apparatus according to claim 1, characterized in that the first support (64) is arranged in an intermediate and central position with respect to the pair of opposite and parallel columns (62) and at facing the rotating plate (19).

6. The filling apparatus according to claim 1, characterized in that the second support (65) is arranged aligned with the first support (64) and substantially adjacent thereto with the first support (64) being in an intermediate position between the rotating plate (19) and the second support (65).

7. The filling apparatus according to, claim 1 characterized in that the pair of parallel and opposite columns (62) and the first support (64) form a support structure for the tamping filling unit (40), the parallel and opposite columns (62) with respect to which the first plate (47) is fixed and the first support (64) with respect to which a dosing disk body (45) of said tamping filling unit (40) is fixed adapted to receive the powdered product coming from a first (43) and second (44) hopper and with which engage compression pins (46) of said powdered product connected to the first plate (47), the pair of parallel and opposite columns (62) and the second support (65) form a support structure for the dosing filling unit (42) with the pair of parallel and opposite columns (62) with respect to which the second plate (60) is fixed to which the functional components for a rotation and movement of dosing syringes (53) adapted to withdraw powdered product from a second hopper (52) fed with powdered product from a first hopper (50) and the second support (65) with respect to which a support bracket (59) is fixed to which the second hopper (52) is stabilized.

8. The filling apparatus according to claim 1, characterized in that the variation from a tamping filling configuration to a dosing filling configuration comprises the steps of decoupling the first plate (47) of the tamping filling unit (40) with respect to the pair of parallel and opposite columns (62), decoupling the dosing disk body (45) with respect to the first support (64), coupling the second plate (60) of the dosing filling unit (42) with the same pair of parallel and opposite columns (62), coupling the support bracket (59) for the second hopper (52) of said filling unit with the second support (65), stabilizing the plates (47, 60) being implemented with the screws-bodies (70) for fixing and adjusting/calibrating the height position of the plates (47, 60).

* * * * *